(12) United States Patent
Francese (10) Patent No.: US 9,473,330 B1
(45) Date of Patent: Oct. 18, 2016

(54) CONTINUOUS TIME LINEAR EQUALIZER WITH A PROGRAMMABLE NEGATIVE FEEDBACK AMPLIFICATION LOOP

(71) Applicant: International Business Machines Corporation, Armonk, NY (US)

(72) Inventor: Pier Andrea Francese, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/732,273

(22) Filed: Jun. 5, 2015

(51) Int. Cl.
*H04L 25/03* (2006.01)
*H04B 1/12* (2006.01)

(52) U.S. Cl.
CPC ......... *H04L 25/03057* (2013.01); *H04B 1/123* (2013.01); *H04L 25/03267* (2013.01)

(58) Field of Classification Search
CPC .................. H04L 25/03057; H04L 25/03885; H04L 27/01; H04L 25/03343; H04L 7/0025; H04L 2025/03356; H04L 25/03019; H04L 25/0307; H04L 25/03878; H04L 7/0087; H04B 10/616; H04B 10/6971; H04B 1/123; H04B 3/16; H04B 10/564; H04B 10/588; H04B 10/60; H04B 10/69; H04B 10/693; H04B 1/16; H04B 3/00; H04B 3/30
USPC ....................................................... 375/233
See application file for complete search history.

(56) References Cited

U.S. PATENT DOCUMENTS

| 8,325,793 | B2* | 12/2012 | Zhong ............... H04L 25/03019 375/233 |
| 8,335,249 | B1 | 12/2012 | Su et al. |
| 8,810,319 | B1 | 8/2014 | Chan et al. |
| 8,861,583 | B2 | 10/2014 | Liu |
| 2012/0201289 | A1 | 8/2012 | Abdalla et al. |
| 2014/0167821 | A1 | 6/2014 | Yang et al. |
| 2014/0269888 | A1* | 9/2014 | Annampedu ........... H04L 27/01 375/233 |
| 2015/0295736 | A1* | 10/2015 | Bulzacchelli ..... H04L 25/03057 375/233 |
| 2015/0311932 | A1* | 10/2015 | Fujii ....................... H04B 3/00 375/233 |

OTHER PUBLICATIONS

Bulzacchelli et al., "A 28Gb/s 4-Tap FFE/15-Tap DFE Serial Link Transceiver in 32nm SOI CMOS Technology," (ISSCC), 2012 IEEE International Solid-State Circuits Conference Digest of Technical Papers, Feb. 19-23, 2012, pp. 324-326.

(Continued)

*Primary Examiner* — Eva Puente
(74) *Attorney, Agent, or Firm* — Scully, Scott, Murphy & Presser, P.C.; Daniel P. Morris, Esq.

(57) ABSTRACT

A continuous time linear equalizer and method of operation. The equalizer includes circuitry configured to provide a high-pass transfer function having a peaking frequency to equalize an input signal into an output signal. The circuitry includes an input gain stage configured to receive an input signal and to provide a gain; and an active peaking stage configured to set the gain at a peaking frequency. A bandwidth extension unit is configured to shift the peaking frequency of the continuous time linear equalizer to a higher frequency.

20 Claims, 7 Drawing Sheets

(56) References Cited

OTHER PUBLICATIONS

Gondi et al., "Equalization and Clock and Data Recovery Techniques for 10-Gb/s CMOS Serial-Link Receivers," IEEE Journal of Solid-State Circuits, vol. 42, No. 9, Sep. 2007, pp. 1999-2011.
Wu et al., "A 10Gb/s Analog Equalizer in 0.18um CMOS," ASIC, IEEE 10th International Conference, (ASICON 2013), Oct. 28-31, 2013, p. 965. Sun et al., "A 26-28-Gb/s Full-Rate Clock and Data Recovery Circuit With Embedded Equalizer in 65-nm CMOS," IEEE Transactions on Circuits and Systems I: Regular Papers, vol. 61, Issue 7, Feb. 26, 2014, Abstract only.
Ramezani et al., "An 8.4mW/Gb/s 4-lane 48Gb/s multi-standard-compliant transceiver in 40nm digital CMOS technology," 2011 IEEE International Solid-State Circuits Conference Digest of Technical Papers, Feb. 20-24, 2011, Abstract only.

* cited by examiner

CONTINUOUS TIME LINEAR EQUALIZER WITH A PROGRAMMABLE NEGATIVE FEEDBACK AMPLIFICATION LOOP

BACKGROUND

The present invention relates to the field of equalization in high-speed receiving units, particularly to a continuous-time linear equalization. Furthermore, the present invention relates to a continuous-time linear equalizer suitable for the implementation in integrated circuitry, particularly in CMOS technology.

Data transceiving systems for high-speed communication are subject to signal distortion of the transmitted signal. Various measures are applied to reconstruct the transmitted data from the received analog signal. In receiving units, a number of equalizers are commonly provided to compensate for losses and signal distortion substantially caused by propagating the data signal via the transmission channel.

One known measure concerns an equalization of the received analog signal in the continuous time regime, i. e. before sampling and digitization and before the final digital processing of information is performed, by means of a continuous-time linear equalizer. The received analog signal to be processed by the continuous-time linear equalizer corresponds to a continuous voltage or current signal which is transmitted across the physical transmission channel according to a digital modulation format, e. g. to non-return-to-zero binary level signaling or to a pulse amplitude modulation with four signaling levels (PAM-4). It is the general purpose of a continuous-time linear equalization to compensate for the losses of high-frequency components of the transmitted analog signal which are caused by attenuation and dispersion of the signal propagating along the transmission channel.

Continuous time linear equalizers (CTLE) are used in the receiving units in order to equalize the transmission channel attenuation up to a peaking frequency by means of a high-pass transfer function. Generally, CTLE use active peaking transistor arrays followed by integrating summers to achieve an equalization for high-speed data transmission systems. However, for very high-speed transmission systems, the combination of active peaking transistor arrays and integrating summer might not be sufficient in order to reach the required performance, particularly for implementation in a higher integration technology, such as 14 nm CMOS technology.

A challenge for designing continuous time linear equalizers is extending its bandwidth and increasing the peaking available at half-baud frequency. Bandwidth of these continuous time linear equalizers are often extended by inductors. A limitation of the high-frequency bandwidth of conventional approaches can be addressed with passive inductors, as proposed in Bulzacchelli, John F. et al. "A 28-Gb/s 4-Tap FFE/15-Tap DFE Serial Link Transceiver in 32-nm SOI CMOS Technology", IEEE, Journal of Solid State Circuits, Vol. 47, No. 12, December 2012. However, passive inductors are usually bulky, i.e. have a high area consumption when integrated in a CMOS technology, have a fixed inductance and provide a substantial temperature dependency.

Document U.S. Pat. No. 8,810,319 B1 discloses a conventional continuous-time linear equalizer design which uses a capacitive-source-degenerated differential wideband amplifier. However, it can only accommodate a limited bandwidth because the bandwidth is heavily dependent on the load capacitance.

SUMMARY

According to a first aspect, a continuous time linear equalizer for providing a transfer function having a peaking frequency to equalize an input signal into an output signal is provided, comprising:

an input gain stage configured to receive an input signal and to provide a gain;

an active peaking stage configured to set the gain at a peaking frequency;

a bandwidth extension unit configured to shift the peaking frequency of the continuous time linear equalizer to a higher frequency.

It may be provided that the bandwidth extension unit comprises an active inductance.

Alternatively or additionally, the active inductance may have a configuration in which a signal generated by applying an impedance on the output signal is negatively coupled with a transconductance amplifier.

It may further be provided that the impedance is formed by at least one resistively self-biased diode.

Alternatively or additionally the impedance may be formed by a negative amplifier including a diode and a fractional positive feedback load.

Furthermore, the transconductance amplifier may have a variable gain to variably set the active inductance.

According to an embodiment the transconductance amplifier may have an enable input to activate or deactivate the active inductance.

According to an embodiment the active inductance may be configured to be variably set.

It may be provided that the active peaking stage is configured to variably set the gain at a peaking frequency.

The input gain stage may be configured to variably set the gain.

Furthermore, a control unit may be configured to variably set the gain of the active peaking stage at the peaking frequency, and/or to variably set the gain of the input gain stage and/or to variably set the peaking frequency of the continuous time linear equalizer.

According to a further aspect a continuous time linear equalizer for providing a transfer function to equalize an input signal into an output signal is provided, comprising:

an input gain stage configured to receive an input signal and to provide a gain;

an active peaking stage configured to set the gain at a peaking frequency;

a bandwidth extension unit for shifting the peaking frequency of the continuous time linear equalizer to a higher frequency;

a gain loss compensation unit for increasing the gain at frequencies below a zero frequency of the transfer function.

Furthermore, the gain loss compensation unit may be configured to be variably set.

According to an embodiment the gain loss compensation unit may have an integrating gain stage which include a transconductance amplifier to provide a programmable gain at frequencies below the zero frequency of the transfer function and an injection unit for injecting an injection current to compensate a common-mode voltage effected by the integrating gain stage.

It may be provided that the injection current is applied into a current path of the transconductance amplifier of the integrating gain stage.

Furthermore, a control unit may be configured to variably set the gain of the active peaking stage at the peaking frequency, and/or to variably set the gain of the input gain stage and/or to variably set the peaking frequency of the continuous time linear equalizer.

The bandwidth extension unit may comprise an active inductance, wherein the active inductance has a configuration in which a signal generated by applying an impedance on the output signal is negatively coupled with a transconductance amplifier.

The impedance may be formed by at least one resistively self-biased diode or wherein the impedance is formed by a negative amplifier including a diode and a fractional positive feedback load.

According to an embodiment the active inductance may be configured to be variably set.

According to a further aspect a method for calibrating the above continuous time linear equalizer is provided, including the steps of:

a) starting from a minimum bandwidth setting corresponding to a maximum gain, continuously or stepwise increasing the bandwidth setting of the bandwidth extension unit so that the DC gain at frequencies below a zero frequency is decreased;
b) increasing the integrating summer mirror ratio which will increase both the DC gain and a common mode voltage at an integrating summer output
c) Adjusting and/or minimizing the common mode voltage by setting an injection current $I_{DAC}$ of an injection unit of the gain loss compensation stage;
d) Depending on whether the DC gain measured at an output terminal of the integrating summing unit equals or is higher than a predetermined DC gain, repeating steps b) to d).
e) Depending on whether the peaking frequency is adapted to the input signal, repeating steps a) to e).

BRIEF DESCRIPTION OF THE SEVERAL VIEWS OF THE DRAWINGS

Embodiments are described in more detail in conjunction with the accompanying drawings, in which.

DETAILED DESCRIPTION

In the following, a continuous-time linear equalizer to be implemented as an integrated circuit is disclosed. The continuous-time linear equalizer substantially equalizes gain losses within the required bandwidth in a data stream received across a communication channel.

Figure 1:
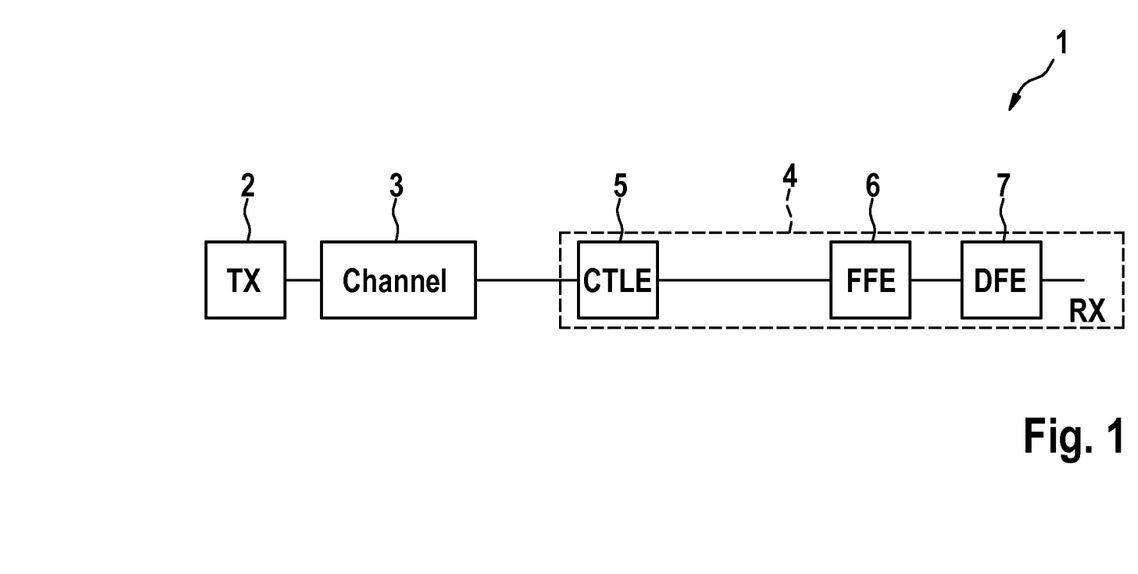
FIG. 1 schematically shows a receiving unit for receiving a high-speed data stream using an analog-digital converter and a decision-feedback equalizer.

In detail, FIG. 1 illustrates a transmission system 1 having a transmission unit 2 which is configured to transmit a serial data stream over a transmission channel 3 to be received by a receiving unit 4. In general, the bandwidth of the transmission channel 3 may be reduced by dielectric losses and reflections due to impedance discontinuities. In the time domain, the signal experiences attenuation which is frequency dependent and limits the overall bandwidth of the transmission. The incoming data stream is received in a continuous time linear equalizer 5, which is configured to equalize the attenuation particularly for frequencies occurring in an upper portion of the required bandwidth. The continuous-time linear equalizer 5 usually serves as a first stage in the receiving unit 4 to which the incoming analog signal is applied. Furthermore signal distortions caused by the limited channel bandwidth are compensated by the application of further equalization functions which may be implemented in a feed-forward equalizer 6 and a decision-feedback equalizer 7.

Figure 2:
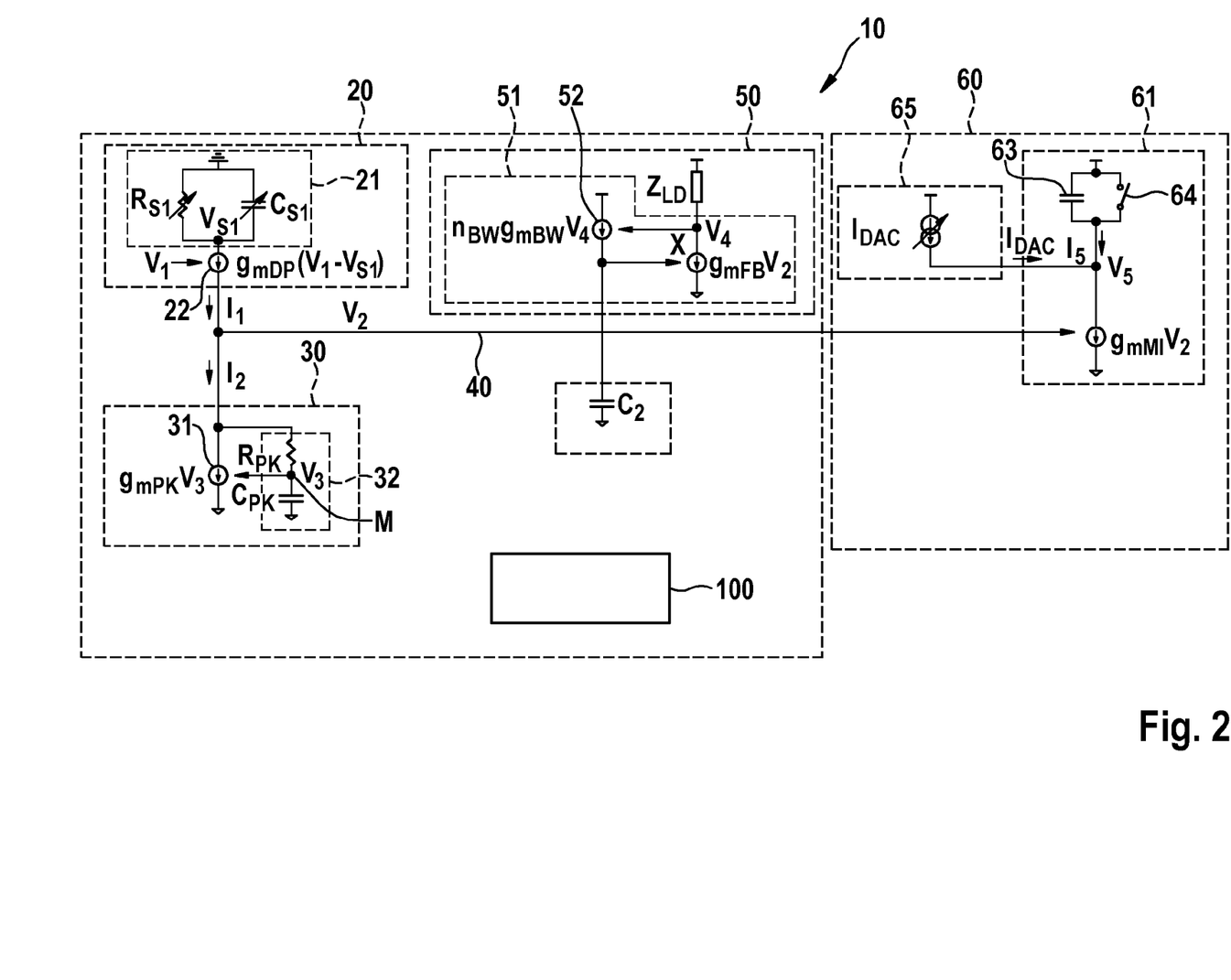
FIG. 2 schematically shows a diagram for a continuous-time linear equalizer having a negative feedback amplification loop and a DC gain loss compensation.

FIG. 2 schematically shows as a small signal circuit a non-differential continuous-time linear equalizer 10 for use in a receiving unit of a transmission system. The continuous-time linear equalizer 10 may be implemented together with the receiving unit 4 in CMOS technology.

In FIG. 2, a continuous-time linear equalizer 10 is schematically shown. The continuous-time linear equalizer 10 comprises an input gain stage 20 which may include a transconductance amplifier which is configured to amplify an input voltage $V_1$ of an input signal into a corresponding current signal. Furthermore, the input gain stage 20 may provide a frequency-dependent source degeneration. The input gain stage 20 may be configured to be programmable so that a preset or adjustable gain and a preset or adjustable peaking can be obtained. The gain of the input gain stage 20 can be set by a control unit 100.

The current output of the input gain stage 20 is coupled with a node N and applied to a signal line 40 which provides an output voltage $V_2$ of the continuous-time linear equalizer 10.

The input gain stage 20 is also coupled with an active peaking stage 30. The active peaking stage 30 can be set to provide a variable peaking. Peaking is defined as the increment of gain of a high-pass filter which is measured as the difference between the maximum gain at high-frequency and the minimum gain at low frequency.

In detail, the input gain stage 20 may have a programmable degeneration unit 21 including a programmable resistance $R_{S1}$ and a programmable capacity $C_{S1}$ which may be connected in parallel. The programmable degeneration unit 21 is configured to provide a frequency dependent degeneration voltage. The source degeneration make the input gain stage 20 have a higher output impedance and a more linear gain. A differential pair of transistors is said to be degenerated when the source terminals are not shorted together but are separated by an intermediate element such as a resistor and/or a capacitor.

The programmable degeneration unit 21 is connected in series with a first transconductance amplifier 22 having a gain $g_{mDP}$ and providing a current $I_1$. The first transconductance amplifier 22 is controlled by the input voltage $V_1$. The serial connection of the degeneration unit 21 and the first transconductance amplifier 22 may be coupled between a first supply potential, such as a high supply potential VDD and the node N.

Furthermore, the active peaking unit 30 has a peaking amplifier 31 with a programmable gain of $g_{mPK}$, which connects the node N with a second supply potential such as a low supply potential, e.g. a ground potential GND. A serial connection 32 of a peaking resistor $R_{PK}$ and a peaking capacity $C_{PK}$ is coupled in parallel to the peaking amplifier 31 with the output mode N. At the middle node M between the series connection 32 of the peaking resistor $R_{PK}$ and peaking capacitor $C_{PK}$ a control voltage $V_3$ for the peaking amplifier 31 can be tapped. Substantially, the peaking amplifier 31 of the active peaking unit 30 draws a current $I_2$ from the output node N which substantially may corresponds to $g_{mPK} \times V_3$.

Furthermore, the output node N is coupled with bandwidth extension unit 50 which includes a negative feedback amplification loop 51. The amplification loop 51 has a second transconductance amplifier 52 which has a programmable gain and a fourth transconductance amplifier 53. The second transconductance amplifier 52 has a stepwise configurable gain $-n_{BW} \times g_{mBW}$ which provides a current onto the node N depending on a control voltage $V_4$.

The control voltage $V_4$ is generated at a middle node X of a series connection of a bandwidth extension impedance $Z_{LD}$ and the third transconductance amplifier 53 having the gain $g_{nFB}$. The series connection of the bandwidth extension impedance $Z_{LD}$ and the third transconductance amplifier 53 is connected between the first supply potential and the second supply potential. The third transconductance amplifier 53 is controlled by the voltage $V_2$ at the output node N, so that a current through the bandwidth extension impedance $Z_{LD}$ is drawn which corresponds to $g_{mFB} \times V_2$. It is noted that the second transconductance amplifier 52 is inversely coupled with third transconductance amplifier 53 which is coupled with the fixed bandwidth extension impedance $Z_{LD}$. This allows to obtain a peaking frequency shifting effect depending on the programmed gain of the second transconductance amplifier 52.

The output node N may be further coupled with an integrated summing unit 61 which may be formed as an input stage of a decision feedback equalizer 60. The integrated summing unit 61 has an integrating gain stage 62 with a gain $g_{mMI}$. The integrating gain stage 62 may include an output voltage $V_2$ controlled fourth programmable transconductance amplifier. In other words the gain stage 62 may be a current mirror whose gain is controlled by both gains $g_{mMI}$ and $g_{mFB}$ as calculated in the formula for V2. The fourth transconductor amplifier 62 therefore provides a current of $g_{mMI} \times V_2$. The fourth transconductance amplifier 62 is serially connected with an integrating capacitor 63 and parallel thereto a clock switch 64 is clocked over a unit interval for resetting the integrating capacitor 63.

The gain of the fourth programmable transconductance amplifier 62 is variable to calibrate the common mode voltage and to compensate DC gain loss at frequencies below a zero frequency caused by the bandwidth extension unit 50. By increasing the gain of the fourth programmable transconductance amplifier 62 the common mode voltage at the output of the integrated summing unit 61 is also increased. By injecting an injection current $I_{DAC}$ the common mode voltage can be fully compensated. The gain loss compensation unit 65 includes a current source which can be programmed so that the DC gain loss due to the bandwidth extension unit 50 is compensated.

The control unit 100 is configured to adjust the continuous time linear equalizer 10 by setting
the programmable resistance $R_{S1}$ and the programmable capacity $C_{S1}$ of the degeneration unit 21,
the peaking of the active peaking unit 30;
the gain of the second transconductance amplifier 52
the gain of the fourth transconductance amplifier;

the injection current for compensating a common mode voltage, which enables the compensation of the gain via the re-adjustment of the fourth programmable transconductance amplifier 62.

In the following, the active peaking with the negative feedback amplification loop is analyzed so as to obtain a programmable shift of the peaking frequency of the transfer function of the continuous-time linear equalizer.

$$\begin{cases} I_2 = g_{mPK} V_3 + \dfrac{V_2 - V_3}{R_{PK}} + sC_2 V_2 \\ 0 = \dfrac{V_3 - V_2}{R_{PK}} + sC_{PK} V_3 \end{cases}$$

$$\Downarrow$$

$$\frac{1}{G_2} = Z_2 = \frac{V_2}{I_2} = \frac{1}{g_{mPK}} \cdot \frac{1 + sR_{PK}C_{PK}}{1 + s \cdot \dfrac{C_{PK} + C_2}{g_{mPK}} + s^2 \cdot \dfrac{C_2}{g_{mPK}} \cdot R_{PK}C_{PK}}$$

$$\begin{aligned} V_2 &= \dfrac{g_{mDP} \cdot V_1 - n_{BW} \cdot g_{mBW} \cdot V_4}{G_2} \\ V_4 &= g_{mFB} \cdot Z_{LD} \cdot V_2 \end{aligned} \Rightarrow V_2 = \dfrac{I_1}{G_2 \cdot \left(1 + \dfrac{n_{BW} \cdot g_{mBW}}{G_2} \cdot g_{mFB} \cdot Z_{LD}\right)}$$

$$G_{loop} = \dfrac{n_{BW} \cdot g_{mBW}}{g_{mPK}} \cdot g_m FB \cdot Z_{LD}$$

$$\Downarrow$$

$$V_2 = \dfrac{I_1}{g_{mPK} \cdot (1 + G_{loop})} \cdot$$

$$\dfrac{1 + sR_{PK}C_{PK}}{1 + s \cdot \dfrac{C_{PK} \dfrac{1 + g_{mPK}R_{PK} \cdot G_{loop}}{1 + G_{loop}} + \dfrac{C_2}{1 + G_{loop}}}{g_{mPK}} + s^2 \cdot \dfrac{\dfrac{C_2}{1 + G_{loop}}}{g_{mPK}} \cdot R_{PK}C_{PK}}$$

Figure 3A:
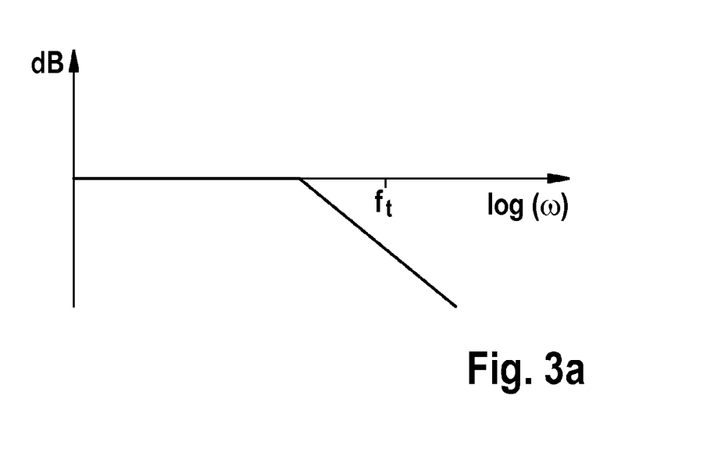
FIGS. 3a to 3c shows diagrams illustrating the transfer functions of the transmission channel the continuous time linear equalizer and the combined transfer function.

In FIG. 3a the transfer function of the transmission channel of the transmission system 1 is shown. It can be seen that the transmitted signal is attenuated at higher frequencies up to a transmission frequency $f_t$ required for the transmission system 1.

Figure 3B:
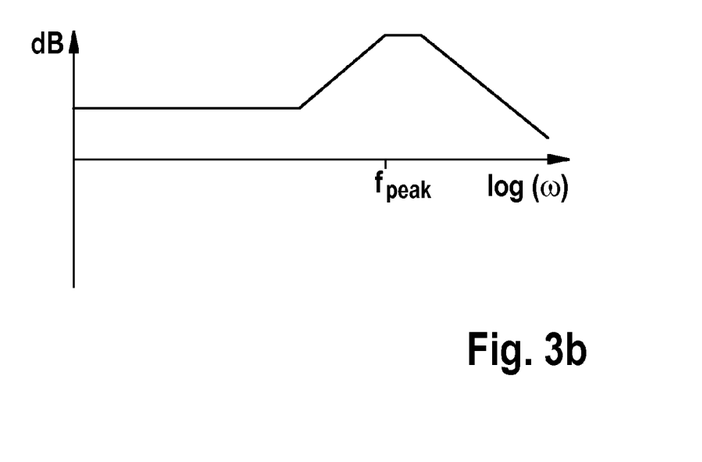

In FIG. 3b, the conventional transfer function of the continuous time linear equalizer 10 is shown having a high-pass filter characteristics with a peaking frequency $f_{peak}$. It can be seen that the gain in a lower frequency portion is substantially constant up to a zero frequency $\omega_0 = 1/R_{PK} \times C_{PK}$ while it is increasing for a higher frequency portion of the transfer function up to the peaking frequency $f_{peak}$. At frequencies higher than the peaking frequency $f_{peak}$ the gain decreases.

Figure 3C:
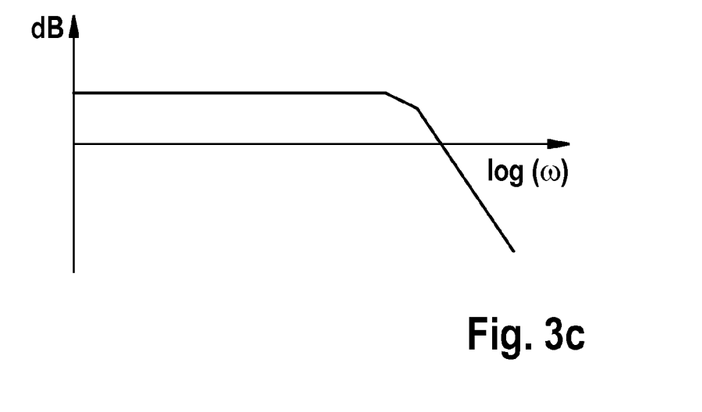

In FIG. 3c the combined transfer function is shown having an equalized gain up to half the transmission frequency $f_t$ (it is half because the maximum frequency of a transmitted signal corresponds to the case of a repetitive 1010 pattern, which corresponds to half the bit rate $f_t$).

Figure 4:
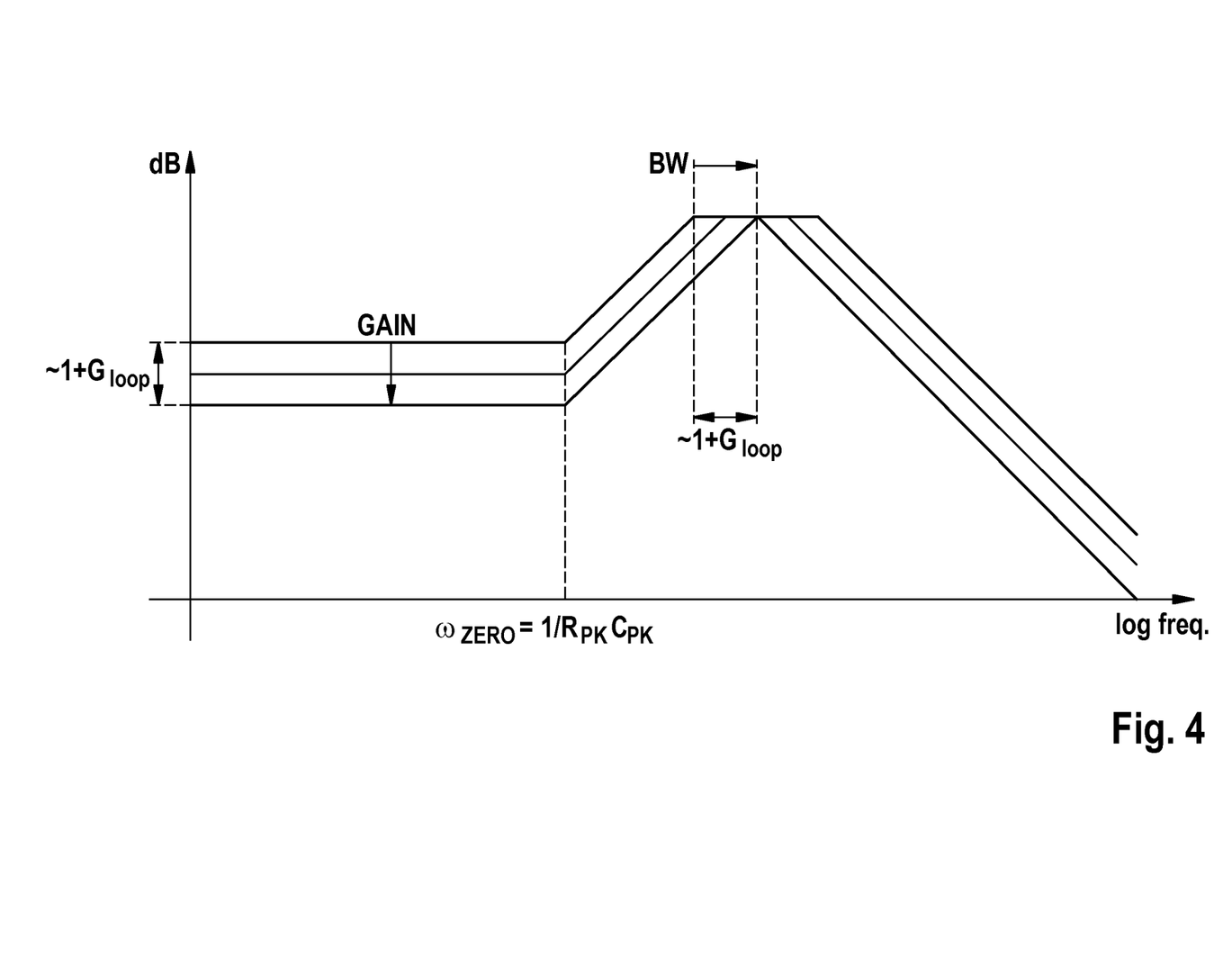
FIG. 4 shows the quantitative dependency of the transfer function of the continuous-time linear equalizer 10 depending on $G_{loop}$.

In FIG. 4, the dependency of the transfer function of the continuous-time linear equalizer 10 depending on $G_{loop}$ is quantitatively shown. Generally, it is preferred to have the peaking frequency $f_{peak}$ close or at half the transmission frequency $f_t$ to obtain an optimized signal transmission quality. The variability can be set by the parameters of bandwidth extension unit 50 and is depending on $\sim 1+G_{loop}$. The parameters are $g_{mBW}$, $g_{mFB}$, and $Z_{LD}$. It can be seen that the transfer function of the continuous-time linear equalizer 10 has a gain below a zero frequency $\omega_0 = 1/R_{PK} \times C_{PK}$ which is the lower the higher the peaking frequency $f_{peak}$ of the continuous time linear equalizer 10 is set. In other words, the gain loss due to the increase of the peaking frequency $f_{peak}$ can be compensated by the current injection unit 65.

Figure 5:
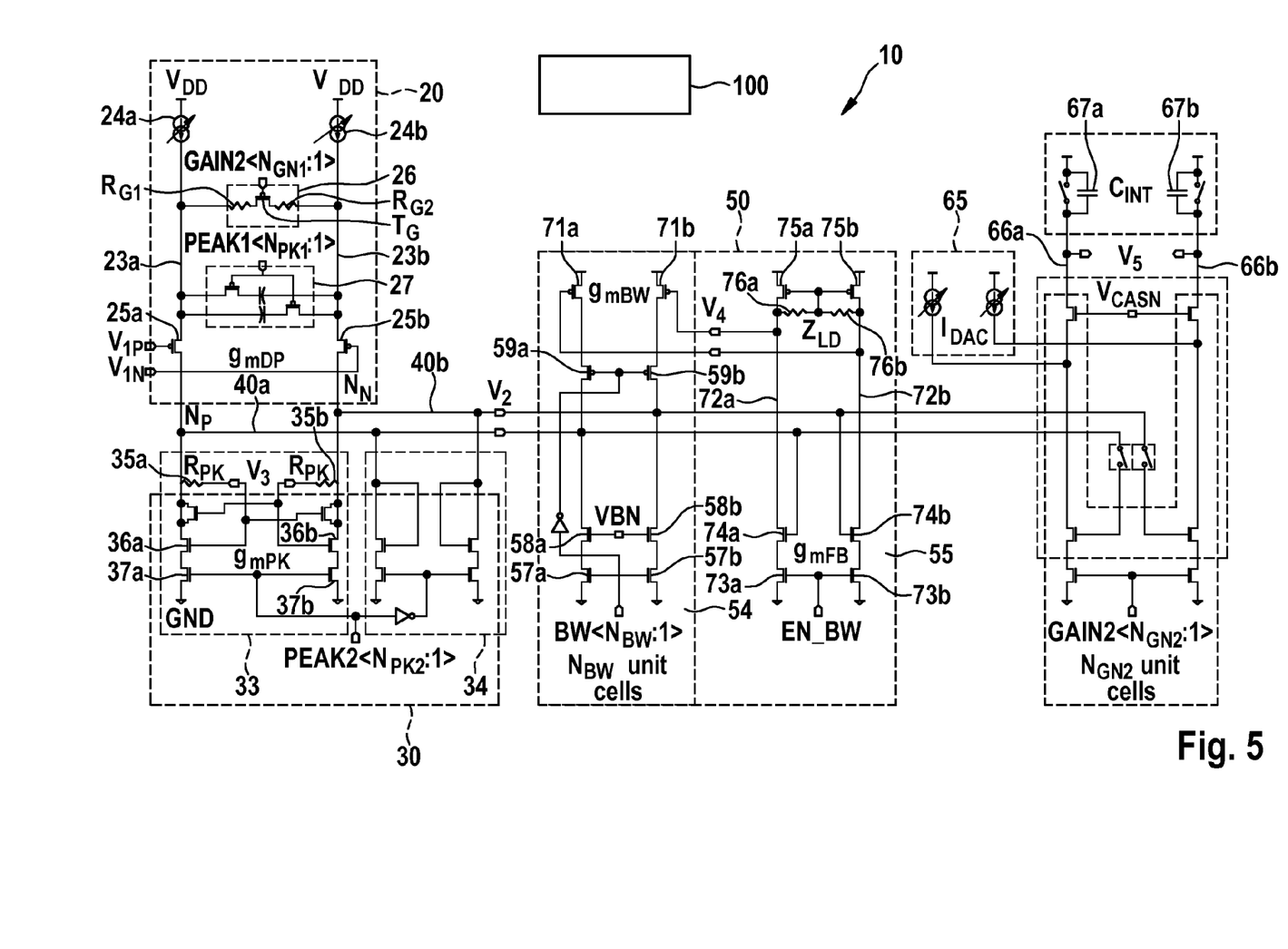
FIG. 5 shows a possible implementation of a continuous-time linear equalizer according to the architecture as shown in FIG. 1.

FIG. 5 shows a more detailed schematic of an implementation of the continuous-time linear equalizer of FIG. 1. The implementation is a differential implementation as the input voltage $V_1$ is usually differential for high-speed data transmission applications.

The input gain stage 20 comprises two branches 23a, 23b each of which has a current source 24a, 24b. The current sources 24a, 24b are serially connected with transconductance transistors 25a, 25b, respectively, between the first supply potential VDD and a respective output node $N_N$, $N_P$, wherein the transconductance transistors 25a, 25b are coupled with the respective node $N_N$, $N_P$, i.e. the output signal lines 40a, 40b on which a differential output voltage $V_2$ comprising the first and second output potentials $V_{2P}$, $V_{2N}$ are applied. At the gate terminals of the transconductance transistors 25a, 25b the input potentials $V_{1p}$, $V_{1n}$ of the input signal are applied. The transconductance transistors 25a. 25b may be implemented as MOS transistors of a first conductivity type such as PMOS transistors.

The middle nodes between the current sources 24a, 24b and the transconductance transistors 25a, 25b of the two branches 23a, 23b are interconnected by an array or group of gain setting elements 26 which has a number $N_{GN1}$ of parallel connected preferably identical gain setting elements 26 each being a series connection of a first resistance $R_{G1}$, a first cross-coupling transistor $T_G$ and a second resistance $R_{G2}$. The first cross-coupling transistor $T_G$ may be implemented as MOS transistors of the first conductivity type such as a PMOS transistor.

For programming the gain of the input gain stage 20, a preselected number $N_{GN1}$ of the gain-setting elements can be activated or deactivated by respective gain setting control signals GAIN1<$N_{GN1}$..1> at the gate terminals of the gain transistors, respectively. The gain setting control signals GAIN1<$N_{GN1}$..1> may be provided by a control unit 100.

Furthermore, a peaking setting unit 27 may be provided which has peaking setting elements. Each peaking setting element has a symmetrical design which may be implemented by a first bridge including a peaking setting transistor $T_{P1}$ connected in series with a first peaking capacity $C_{P1}$ and by a second bridge including a second peaking transistor $T_{P2}$ connected in series with a second peaking capacity $C_{P2}$. The first and second bridges are connected between the middle nodes of the two branches 23a, 23b. The first and second peaking setting transistors $T_{P1}$, $T_{P2}$ may be implemented as MOS transistors of the first conductivity type such as a PMOS transistor. The peaking setting elements are applied so that the first peaking setting transistor $T_{P1}$, is directly coupled with the first branch 23a and the second peaking setting transistor $T_{P2}$ is directly coupled with the second branch 23a.

The gate terminals of the peaking setting transistors in both bridges are interconnected. The so formed peaking setting unit 28 may include a number $N_{PK1}$ of peaking setting elements 27 which may be arranged as a group, in an array or the like so that by applying a respective first peaking setting control signal PEAK1<$N_{PK1}$..1> to the gate terminals of the peaking setting transistors $T_{P1}$, $T_{P2}$, a peaking characteristics of the input gain stage 20 can be programmed.

The active peaking stage 30 includes an active stage 33 and a diode coupled stage 34. The active stage 33 has a number $N_{PK2}$ of preferably identical active stage elements each having two branches 35a, 35b coupled between the output nodes $N_N$, $N_P$ and a second supply potential such as the ground potential GND. In each of the branches 35a, 35b of the active stage 31, a peaking transistor 36a, 36b directly coupled with the respective output node $N_N$, $N_P$ and an enable transistor 37a, 37b are serially connected.

For each active stage element the gate terminals of the enable transistors 37a, 37b are interconnected and one of the number $N_{PK2}$ of second peaking control signal PEAK2<$N_{PK2}$..1> is applied thereto, respectively. The gate terminals of the peaking transistors 36a, 36b are coupled with the respective output node $N_N$, $N_P$ via the peaking resistors $R_{PK}$, and via a capacity $C_{PK}$ such as a capacity corresponding to a gate source capacity of the used MOS transistors with the respective output node of the respective other branch 35a, 35b. The first enable transistors 37a, 37b and the peaking transistors 36a, 36b may be implemented as MOS transistors of the second conductivity type such as NMOS transistors.

The diode coupled stage 34 has a number $N_{PK2}$ of preferably identical diode coupled elements. Each diode coupled element has second enable transistors 38a, 38b and diode-clamped transistors 39a, 39b coupled in series, respectively, so that two branches in each diode coupled element are formed. The gate terminals of the diode-clamped transistors 39a, 39b are coupled with the respective output node $N_N$, $N_P$. The gate terminals of the second enable transistors 38a, 38b is controlled by the inverted second peaking setting control signal PEAK2<$N_{PK2}$..1> so that depending on second peaking setting control signals PEAK2<$N_{PK2}$..1> a number $n_{PK2}$ of active elements of the active stage 33 and a corresponding number $N_{PK2}$−$n_{PK2}$ of diode coupled elements of the diode coupled stage 34 are activated. Thereby, the active peaking load can be set. The diode coupled stage 34 serves to maintain the impact of the active peaking stage 30 onto the output lines independent from the setting provided by the second peaking setting control signals PEAK2<$N_{PK1}$..1>. The second enable transistors 38a, 38b and the diode-clamped transistors 39a, 39b may be implemented as MOS transistors of the second conductivity type such as NMOS transistors.

The bandwidth extension unit 50 has a bandwidth tuning stage 54 and a negative feedback loop stage 55. The bandwidth tuning stage 54 includes a number $N_{BW}$ of preferably identical tuning elements which may be provided as a group or in an array. Each of the tuning elements has two branches 56a, 56b each of which has a series connection of a third enable transistor 57a, 57b, a load transistor 58a, 58b, a fourth enable transistor 59a, 59b and a third transconductance transistor 71a, 71b which form the second transconductance amplifier 52 for a differential operation. The order of the transistors in each of the branches 56a, 56b can be as mentioned and arranged from the second supply potential to the first supply potential. The third enable transistors 57a, 57b and the load transistors 58a, 58b may be implemented as MOS transistors of the second conductivity type such as NMOS transistors. The fourth enable transistors 59a, 59b and the transconductance transistors 71a, 71b may be implemented as MOS transistors of the first conductivity type such as PMOS transistors.

Substantially the enable transistors 57a, 57b, 59a, 59 are coupled so that either the load transistors 58a, 58b or the transconductance transistors 71a, 71b are actively coupled with the output lines 40 (output nodes $N_N$, $N_P$). The gate terminals of the third enable transistors 57a, 57b are coupled with a bandwidth control signal BW<$N_{BW}$..1>, respectively, while the gate terminals of the fourth enable transistors are coupled with the inverted bandwidth control signals BW<$N_{BW}$..1>, respectively. Therefore, either the load transistors 58a, 58b of each tuning element or the transconductance transistors 71a, 71b of each tuning element is activated.

Furthermore, the gate terminals of the transconductance transistors 71a, 71b are coupled with output terminals of a differential amplifier of the negative feedback loop stage 55. The differential amplifier has two branches 72a, 72b. Each of the branches has a series connection of a fifth enable transistor 73a, 73b, an amplifier transistor 74a, 74b, and inductance transistors 75a, 75b. The fifth enable transistor 73a, 73b and the amplifier transistor 74a, 74b may be implemented as MOS transistors of the second conductivity type, such as NMOS transistors, while the inductance transistors may be implemented as MOS transistors of a first conductivity type such as PMOS transistors.

The load transistors 58a, 58b have a fixed preset control voltage applied at their gate terminals. A first terminal of the inductance transistors 75a, 75b is respectively coupled with a first supply potential while the second terminal of the inductance transistors 75a, 75b is coupled with a respective amplifier transistor 74a, 74b. Furthermore, the gate terminals of the inductance transistors are interconnected and coupled with a respective inductance resistor 76a, 76b with each of the output terminals of the differential amplifier. The inductance transistors 75a, 75b and the inductance resistors 76a, 76b together form a resistively self-biased diode which acts as the bandwidth extension impedance $Z_{LD}$. The amplifier transistors 74a, 74b are connected with its first terminal with the output terminals of the differential amplifier and with the gate terminals to the output lines 40 (output nodes $N_N$, $N_P$). The fifth enable transistors 73a, 73b are coupled with their first terminals with the second terminals of the amplifier transistors 74a, 74b, respectively, and coupled with their second terminals with the second supply potential such as a ground potential GND. Their gate terminals are coupled with an enable signal which is provided e.g. by the control unit 100, to enable the bandwidth extension unit 50 to be active.

Furthermore, the integrating summing unit 61 usually has a number $N_{GN2}$ of summing elements each having a differential amplifier 67 (which forms the fourth transconductance amplifier 62) with two branches 66a, 66b coupled with sixth enable transistors 68a, 68b, respectively. Furthermore, the differential amplifiers 67 are coupled with an integration capacitor 67a, 67b for each branch 66a, 66b. Parallel to the integration capacitors 67a, 67b a dump switch is coupled which can be operated by a clock signal or by the control unit 100. The gate terminals of the sixth enable transistors 68a, 68b are interconnected and an integrating gain control signal GAIN2<$N_{GN2}$..1> is applied, e.g. by the control unit 100. Depending on the integrating gain control signals GAIN2<$N_{GN2}$..1> the number of parallel coupled differential amplifiers can be selected to set a gain $g_{mMI}$ of the integrating summing unit 61 which can be regarded as integration constant which may be regarded as the factor/slope by which the integration takes place.

In the two branches 66a, 66b of each of the number $N_{GN2}$ of differential amplifiers a respective injection current can be injected by means of the gain loss compensation unit 65. The gain loss compensation unit 65 comprises a programmable current source for each branch 66a, 66b which are implemented to inject an injection current into the branches 66a, 66b of the differential amplifier of the integrating summing unit 62. This allows to set/increase the gain of frequency portions of the incoming signal which are below the zero frequency $\omega_0$ as explained above. Therefore, the gain loss compensation unit 65 is programmed depending on the setting of the bandwidth extension unit 50 for increasing the peaking frequency $f_{peak}$.

The control unit 100 is configured to adjust the continuous time linear equalizer 10 by setting the programmable resistance $R_{S1}$ by means of the gain setting control signal GAIN1<$N_{GN1}$..1> and the programmable capacity $C_{S1}$ of the degeneration unit 21 by means of the first peaking setting control signal PEAK1<$N_{PK1}$..1>, the peaking of the active peaking unit 30 by means of the second peaking setting control signals PEAK2<$N_{PK2}$..1>;

the gain of the second transconductance amplifier 52 by means of the bandwidth control signals BW<$N_{BW}$..1>;

the gain of the fourth transconductance amplifier 62 by means of the integrating gain control signals GAIN2<$N_{GN2}$..1>;

the injection current $I_{DAC}$ for compensating a common mode voltage, which enables the compensation of the gain via the re-adjustment of the fourth programmable transconductance amplifier 62.

Figure 6:
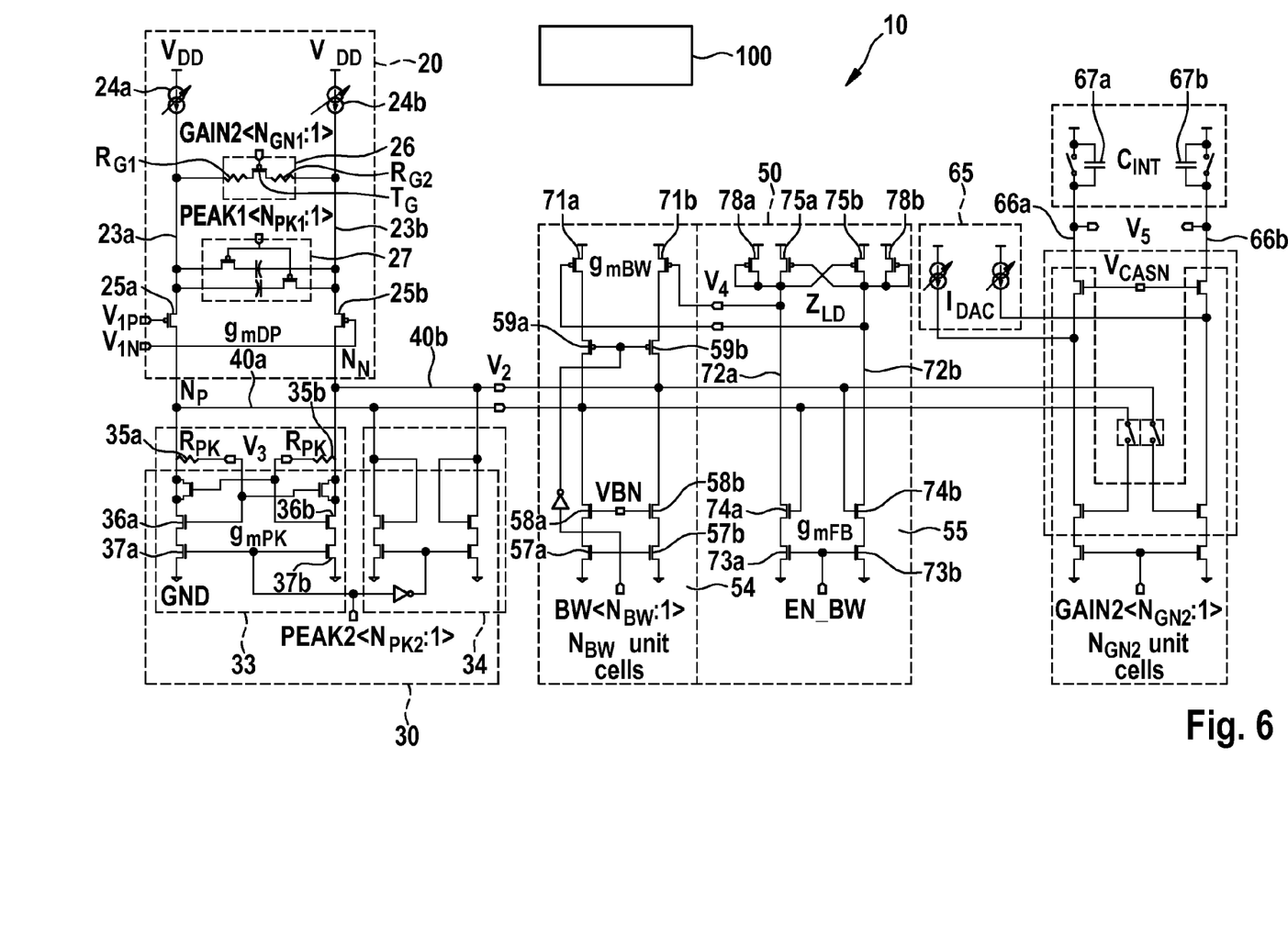
FIG. 6 shows a further possible implementation of a continuous-time linear equalizer.

In FIG. 6, an alternative implementation for the bandwidth extension unit 50 is shown. In contrast to the embodiment of FIG. 5, the bandwidth extension impedance $Z_{LD}$ is formed by the inductance transistors 75a, 75b the gate terminals of which are cross coupled with the respective other branch 72a, 72b while the inductance resistors are omitted. In other words, the inductance transistors 75a, 75b are coupled with their first terminals with the first supply potential and are coupled with their gate terminals with the second terminal of the inductance transistor of the respective other branch. Further inductance transistors 78a, 78b are provided which are diode-clamped and coupled between the first supply potential and the second terminals of the inductance transistors, respectively. So the bandwidth extension impedance $Z_{LD}$ is merely formed by transistors. As resistors usually have high tolerances in an integrated implementation this bandwidth extension impedance $Z_{LD}$ can be dimensioned more accurately.

Generally, continuous-time linear equalizers have been described which have a bandwidth extension unit. The bandwidth extension unit has the effect to variably shift the peaking frequency to higher frequencies and to lower the gain of frequencies below a zero frequency $\omega_0$. The bandwidth extension unit is implemented as or comprises a negative feedback amplification loop which may influence the transfer function provided by the input gain stage and the active peaking stage in manner that above effects are achieved.

One idea of the above continuous-time linear equalizer is further to make the negative feedback amplification loop programmable and to directly connect it to the active peaking load. By making the negative feedback amplification loop programmable the peaking frequency of a transfer function of the continuous-time linear equalizer can be adapted so that the continuous-time linear equalizer can be adjusted to loss characteristics of the transmission channel. The possibility to adapt the peaking frequency allows to provide a maximum gain to the highest frequency portion of the data stream in the transmission channel so that a attenuation of the transmission channel can be compensated.

Particularly the continuous-time linear equalizer according to the embodiments above can be implemented with a low area consumption and a low power consumption compared to an implementation with passive inductors. Furthermore the above embodiments allow a fine tuning of the peaking frequency, so that the overall bandwidth can be increased up to the optimal value which is function of the transmission channel characteristics to be equalized.

As by using the negative feedback amplification loop, the gain decreases for lower frequency portions of the received signal while increasing the peaking frequency, a programmable DC current may be injected in an integrating summing unit. Hence, a DC gain loss can be compensated which increases the DC gain by allowing more common mode current to flow.

Figure 7:
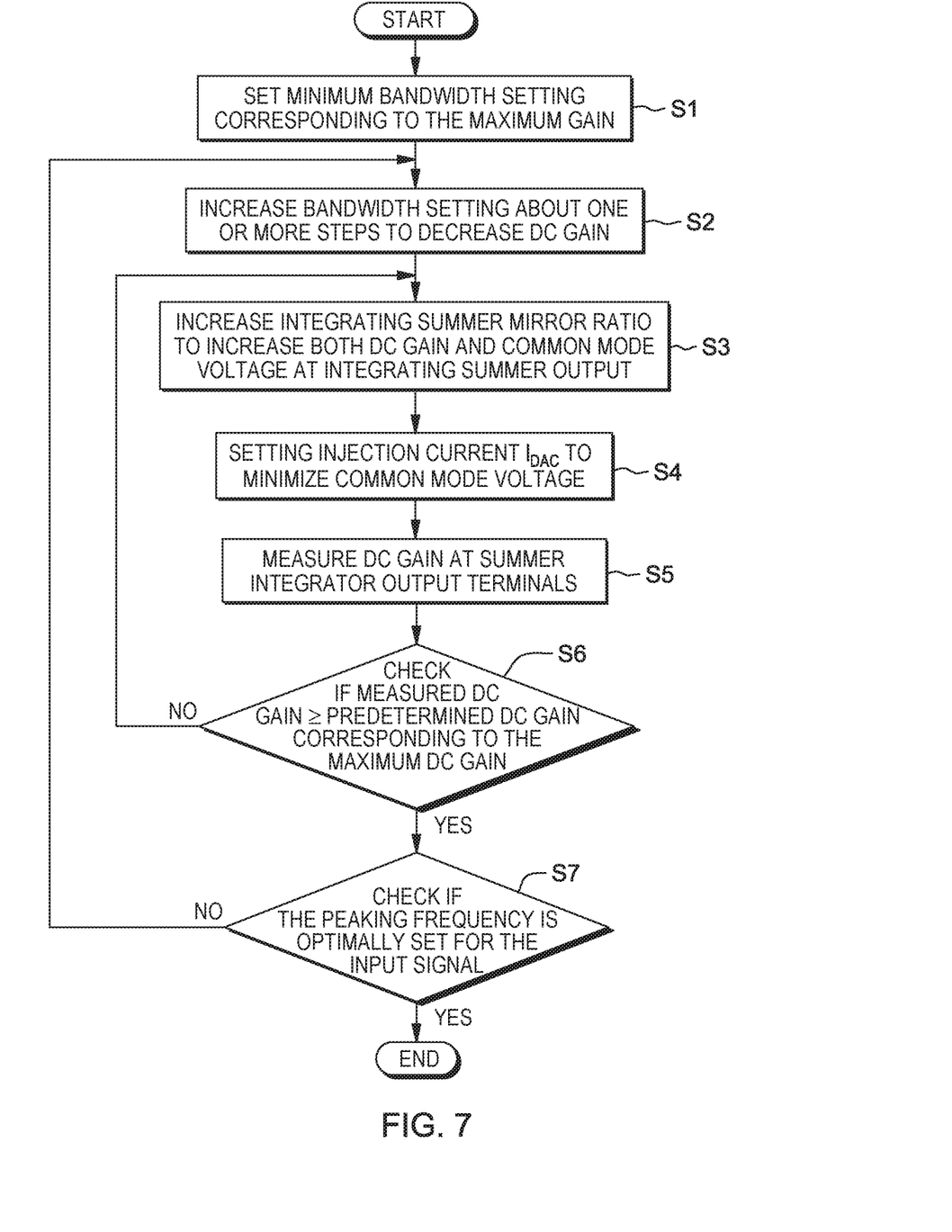
FIG. 7 shows a flow chart illustrating a method for calibrating the continuous time linear equalizer of embodiments of FIGS. 1, 5, and 6

For calibration, the setting of the bandwidth extension unit is selected so that the peaking frequency corresponds to the maximum frequency portion of the incoming data (that is half the transmission rate). This setting allows for a reduced effect of a noise introduced into the transmission channel. For calibrating the transfer function of the continuous time linear equalizer as described above, the following method can be applied which is shown in the flowchart of FIG. 7.

In step S1, a minimum bandwidth setting corresponding to the maximum gain is set.

In step S2 the bandwidth setting is increased about one or any number of steps so that the DC gain is decreased. This can be performed by incrementing the number of activated tuning elements in the bandwidth tuning stage 54 by accordingly setting the bandwidth control signals BW<$N_{BW}..1$>.

In step S3 the integrating summer mirror ratio is increased by one step which will increase both the DC gain and the common mode voltage at the integrating summer output. This can be performed by incrementing the number of activated summing elements in the integrating summing unit 61 by accordingly setting the integrating gain control signal GAIN2<$N_{GN2}..1$>.

In step S4 the common mode voltage can be adjusted and minimized by setting the injection current $I_{DAC}$.

In step S5, the DC gain at the summon integrator output terminals is measured.

In step S6, it is checked if the DC gain measured equals or is higher than a predetermined DC gain which may correspond to the maximum DC gain determined in step S1. If this is not the case (alternative: No), the process is continued with step S3, otherwise (alternative: yes) the process is continued with step S7.

In step S7 it is checked, if the peaking frequency is already set optimally for the input signal. If this is not the case (alternative: no), the process is continued with step S2, otherwise (alternative: yes) the calibration is finished.

The invention claimed is:

1. A continuous time linear equalizer for providing a transfer function having a peaking frequency to equalize an input signal into an output signal, comprising:
   an input gain stage configured to receive an input signal and to provide a gain;
   an active peaking stage configured to set the gain at a peaking frequency;
   a bandwidth extension unit configured to shift the peaking frequency of the continuous time linear equalizer to a higher frequency.

2. The continuous time linear equalizer according to claim 1, wherein the bandwidth extension unit comprises an active inductance.

3. The continuous time linear equalizer according to claim 2, wherein the active inductance has a configuration in which a signal generated by applying an impedance on the output signal is negatively coupled with a transconductance amplifier.

4. The continuous time linear equalizer according to claim 3, wherein the impedance is formed by at least one resistively self-biased diode.

5. The continuous time linear equalizer according to claim 3, wherein the impedance is formed by a negative amplifier including a diode and a fractional positive feedback load.

6. The continuous time linear equalizer according to claim 3, wherein the transconductance amplifier has a variable gain to variably set the active inductance.

7. The continuous time linear equalizer according to claim 3, wherein the transconductance amplifier has an enable input to activate or deactivate the active inductance.

8. The continuous time linear equalizer according to claim 2, wherein the active inductance is configured to be variably set.

9. The continuous time linear equalizer according to claim 1, wherein the active peaking stage is configured to variably set the gain at a peaking frequency.

10. The continuous time linear equalizer according to claim 1, wherein the input gain stage is configured to variably set the gain.

11. The continuous time linear equalizer according to claim 1, wherein a control unit is configured to variably set the gain of the active peaking stage at the peaking frequency, and/or to variably set the gain of the input gain stage and/or to variably set the peaking frequency of the continuous time linear equalizer.

12. A continuous time linear equalizer for providing a transfer function to equalize an input signal into an output signal, comprising:
    an input gain stage configured to receive an input signal and to provide a gain;
    an active peaking stage configured to set the gain at a peaking frequency;
    a bandwidth extension unit for shifting the peaking frequency of the continuous time linear equalizer to a higher frequency;
    a gain loss compensation unit for increasing the gain at frequencies below a zero frequency of the transfer function.

13. The continuous time linear equalizer according to claim 12, wherein the gain loss compensation unit is configured to be variably set.

14. The continuous time linear equalizer according to claim 12, wherein the gain loss compensation unit has an integrating gain stage which include a transconductance amplifier to provide a programmable gain at frequencies below the zero frequency of the transfer function and an injection unit for injecting an injection current to compensate a common-mode voltage effected by the integrating gain stage.

15. The continuous time linear equalizer according to claim 14, wherein the injection current is applied into a current path of the transconductance amplifier of the integrating gain stage.

16. The continuous time linear equalizer according to claim 12, wherein a control unit is configured to variably set the gain of the active peaking stage at the peaking frequency, and/or to variably set the gain of the input gain stage and/or to variably set the peaking frequency of the continuous time linear equalizer.

17. The continuous time linear equalizer according to claim 12, wherein the bandwidth extension unit comprises an active inductance, wherein the active inductance has a configuration in which a signal generated by applying an impedance on the output signal is negatively coupled with a transconductance amplifier.

18. The continuous time linear equalizer according to claim 17, wherein the impedance is formed by at least one resistively self-biased diode or wherein the impedance is formed by a negative amplifier including a diode and a fractional positive feedback load.

19. The continuous time linear equalizer according to claim 17, wherein the active inductance is configured to be variably set.

20. A method for calibrating the continuous time linear equalizer comprising:
(a) at an input gain stage configured to receive an input signal, starting from a minimum bandwidth setting corresponding to a maximum gain, and continuously or stepwise increasing the bandwidth setting of a bandwidth extension unit so that a DC gain at frequencies below a zero frequency is decreased;
(b) increasing an integrating summer mirror ratio to increase both the DC gain and a common mode voltage at an integrating summer output terminal of the integrating summing unit;
(c) adjusting and/or minimizing the common mode voltage by setting an injection current $I_{DAC}$ of an injection unit of a gain loss compensation unit for increasing the gain;
(d) measuring the DC gain at the integrating summer output terminal;
(e) determining whether the DC gain measured at the output terminal of the integrating summing unit equals or is higher than a predetermined DC gain, and repeating steps b) to e) if the measured DC gain is not equal to or higher;
(f) depending on whether the peaking frequency is adapted to the input signal, repeating steps a) to f).

* * * * *